June 22, 1926.

H. C. TROWE

WHEELBARROW

Filed May 8, 1922

1,590,000

2 Sheets-Sheet 2

Inventor:
Henry C. Trowe
By: Wm. O. Belt Atty.

Patented June 22, 1926.

1,590,000

UNITED STATES PATENT OFFICE.

HENRY C. TROWE, OF HAMMOND, INDIANA.

WHEELBARROW.

Application filed May 8, 1922. Serial No. 559,180.

This invention relates to wheelbarrows and has for its principal object to facilitate the dumping or unloading of these vehicles.

A further object of the invention is to permit the operator to easily move the body from a stable traveling position to an efficient dumping position without giving corresponding movement to the handles.

A further object of the invention is to mount the body so as to permit it to have a limited movement in a direction generally lengthwise to the base and also a limited rotary movement permitting it to assume a substantially upright position.

Figure 1:
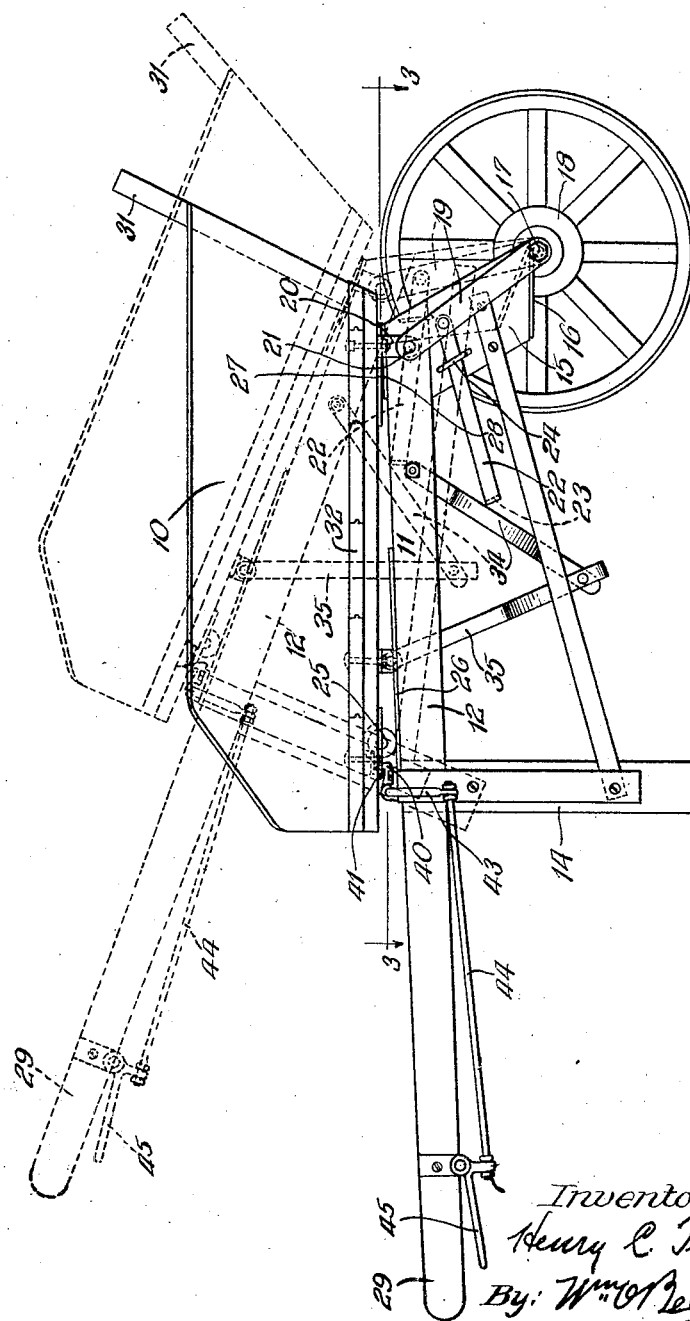
Figure 2:
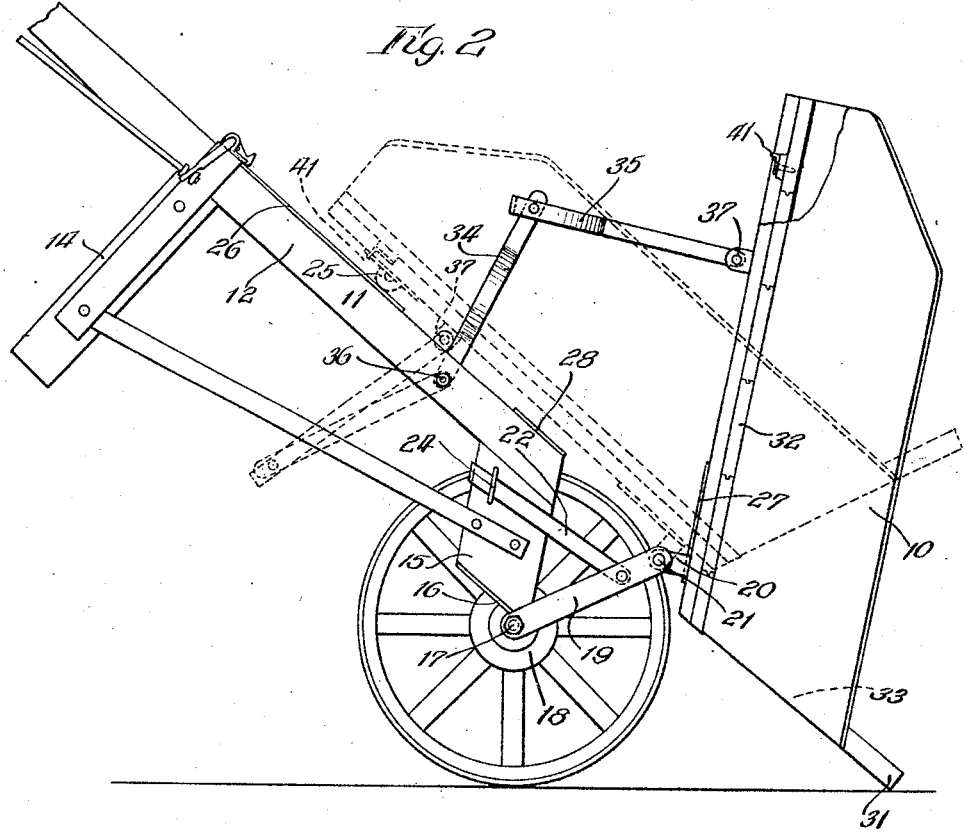
Figure 3:
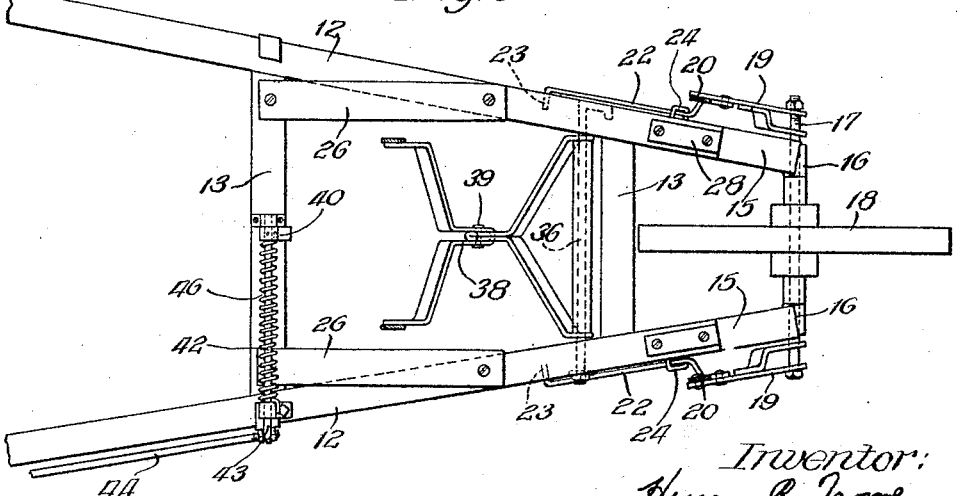

Further objects of the invention will become apparent as the description is read in connection with the accompanying drawing illustrating a selected embodiment of the invention in which Fig. 1 is a side elevation showing a wheelbarrow embodying this invention, in dotted line as it would be in motion and solid lines as it would be at rest;

Fig. 2 is a similar side elevation showing the wheelbarrow in dumping position; and Fig. 3 is a plan view with the body removed.

The wheelbarrow consists essentially of the body 10 and a base 11. The latter includes the side bars 12 connected by the cross bars 13, in the usual manner, and equipped with the customary legs 14. At the front end of the frame thus formed I provide depending brackets 15 which carry at their lower ends bearings 16 for an axle 17 on which a wheel 18 is journaled.

The body is connected to the base by a mounting here shown as including links 19 pivoted on the extended ends of the axle 17 and pivotally connected at their upper ends to brackets 20 carried by the forward end of the body. The bolts or pins 21 which form this pivotal connection are sufficiently distant from the axle 17 to support the front end of the body a little above the top of the side bars 12 when the links 19 are at right angles thereto. In order to properly limit the swinging of the links 19 I pivot to each a strap 22 having an inturned free end 23 adapted to engage the rear side of the brackets 15, as illustrated in Fig. 2, when the body is in dumping position. These straps are held in proper relation to the brackets by guides 24.

Adjacent to the rear end of the body I provide rollers 25 which rest on tracks or rails 26 suitably secured to the side pieces 12 and the rear cross piece 13. Adjacent to the front end of the body I secure substantially flat plates 27 adapted to rest on similar plates 28 on top of the side pieces 12 and aligned with the plates 26.

When the parts are in normal position, as in transporting a load, the plates 27 and the rollers 25 rest upon their corresponding bearings on the base and support the body strongly at substantially the four corners. The links 19 and the straps 22 permit the body to move in a direction substantially lengthwise to the frame and the pivots 21 permit the body to rotate relative to the links 19. These two motions make it possible to dump the body by merely giving the handles 29 a slight snap and without swinging the base through any considerable angle. The initial movement of the body is generally forward, the front end being carried by the links 19 and the rear end by the rollers 25. When the links 19 reach the limit of their rotation they are stopped with a jerk by the straps 22 while the body is moving generally forward but slightly downward. This coupled with the momentum of the body and the load will cause the latter to swing about the pivots 21 to a position such as indicated in Fig. 2 in which the tip 31 of the front end of the barrow is on the ground or other support. When in this position it will be clear that whether the body is constructed with a flat bottom 32 and an inclined front 33 such as shown in the present drawings or otherwise, that all the supporting surfaces of the body will be in position to cause the load to fall out by gravity.

In order to facilitate the return of the body to normal position and in some cases to limit its rotary movement about the pivots 21 I provide the links 34 and 35, the former being pivoted to the frame at 36 and the latter to the body at 37. As shown these links are made from bar stock bent to substantially V-shape as indicated in Fig. 3 and the link 35 is equipped with a narrow yoke 38 in which the small end of the link 34 is pivoted by the rivet 39. This arrangement is advantageous because it makes a folding connection that can readily assume the position shown in Fig. 1 or that shown in Fig. 2 without interfering with any of the parts of the base and which will not automatically lock when the body is in dumping position. The free end of the yoke 38 strikes the adjacent portion of the link 34 and prevents the links from becoming aligned, which would cause them to either bind or buckle in the wrong direction, when it is desired to lower the body into normal position.

Ordinarily the body will maintain its position on the base without the necessity of any fastening until the barrow is suddenly stopped or the handles are given a slight snap, when the momentum of the load and the body will cause the parts to assume the position shown in Fig. 2 and the load to be dumped. In order to make the vehicle fool proof and make it suitable for use in all kinds of rough work. I provide a pivoted latch 40 mounted on the rear cross piece 13 and engaging a suitable catch 41 secured to the bottom of the body at the rear end. For most cases it will be sufficient to construct the latch 40 and the catch 41 so as to prohibit forward movement of the body relative to the base but if desired the latch can be the equivalent of a hook to positively hold the body down on the base. Preferably the latch is equipped with a shaft 42 having a lever arm 43 connected by a link 44 with the grip lever 45 adjacent to one or both of the handles 29. A spring 46 normally holds the latch in engaged position.

With this construction when it is desired to dump the wheelbarrow its motion is suddenly checked or the handles 29 are given a slight upward snap accompanied with upward movement of the grip lever 45. This will cause the body to move forward along the base, the front end rocking about the axis of the shaft 17 and the rear end traveling on the tracks 26 until the links 19 reach the limit of their movement when the body pivots quickly about the pins 21 and assumes the position shown in Fig. 2. The initial movement of the body is substantially lengthwise to the base although the front end does follow the arc of a circle having its center in the axis of the shaft 17 and this is immediately followed by rotary movement about the pins 21. There is, however, a distinct advantage in having the front end of the body first moved in the arc of a circle. By arranging the links 19 substantially as shown, they are inclined to the rear of the vertical when the body is in normal traveling position and are inclined in front of the vertical when the body moves to dumping position. As the result the links tend to hold the body in normal traveling position until it is given sufficient momentum relative to the frame to lift the front end over dead center or vertical position of the links, and the downward movement of the front end of the body as these links approach the limit of their rotation gives the body and the load motion in the direction tending to facilitate pivotal movement about the pins 21 as soon as the links 19 are arrested by the straps 22.

Ordinarily the tip of the body 31 will find some support when the body moves to position shown in Fig. 2 but in case there is nothing for the tip to strike the links 34 and 35 will limit the rotary movement of the body about the pins 21, and in all cases these links will assist in returning the body to normal position. Different operators will effect this result differently, but it is best accomplished by giving the handles a quick snap downwardly accompanied by a quick motion forwardly. This will give the body a quick rotation rearwardly and sufficient rearward motion lengthwise to the base to bring it to normal position and permit the latch 40 to engage the catch 41.

Wheelbarrows embodying the principles above set forth are just as easy to handle while traveling as the ordinary wheelbarrow and are much more easily and conveniently dumped forwardly. In addition they can be dumped to either side in the customary manner without permitting the body to move relative to the base. The successive longitudinal and rotary movement of the body makes the dumping operation practically automatic after the initial snap of the handles has been given.

I prefer to use the mounting here described in which the front end of the body first rotates about the axle 17 and then about the pins, 21 but very good results can be obtained by merely allowing the body to slide forwardly first and then pivoted to dumping position. The gist of the invention is to move the body slightly forward and then rotate it to a position in which the supporting surfaces will automatically discharge the load by gravity.

I am aware that changes may be made in the form, construction and arrangement of the invention, as set forth in the selected embodiment therein. without departing from the scope or sacrificing any of its material advantages, and I therefore reserve the right to make all such changes as fairly fall within the scope of the following claims:

I claim:

1. In a wheelbarrow, the combination of a frame comprising a carrying wheel and an axle therefor, a body normally supported on the frame in rear of said axle, said body being slidable lengthwise of the frame and tiltable at the end of its forward sliding movement, links pivoted on said axle and pivotally connected to said body, and means for limiting the pivotal movement of said links about said axle to thereby limit the sliding movement of the body and permit the tilting movement of the body.

2. In a wheelbarrow, the combination of a frame having an axle and a carrying wheel thereon, a body movable lengthwise and tiltable relative to the frame, rollers under the rear end of the body to travel on said frame, links pivoted on said axle and pivotally connected to the forward end of said body, means for limiting the forward sliding movement of the body, and means for limiting the pivotal movement of the body.

3. In a wheelbarrow, the combination of a frame comprising a carrying wheel and an axle thereon, a body movable lengthwise of said frame and tiltable at the end of its forward sliding movement, links pivoted on said frame and pivotally connected to the forward end of said body, and means for limiting the pivotal movement of said links to thereby limit the sliding movement of the body.

4. In a wheelbarrow, the combination of a frame comprising a carrying wheel and an axle thereon, a body movable lengthwise of said frame and tiltable at the end of its forward sliding movement, links pivoted on said frame and pivotally connected to the forward end of said body, means for limiting the pivotal movement of said links to thereby limit the sliding movement of the body, and means for limiting the pivotal movement of the body.

HENRY C. TROWE.